Feb. 2, 1932.  C. L. KISSINGER  1,843,685
AUTOMOTIVE TRUCK
Filed Jan. 17, 1930  2 Sheets-Sheet 1
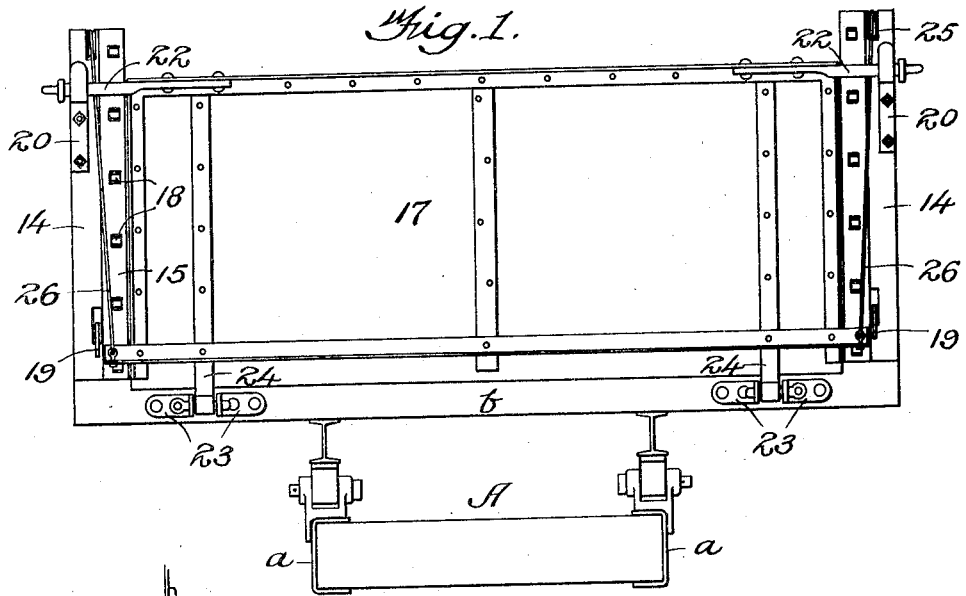
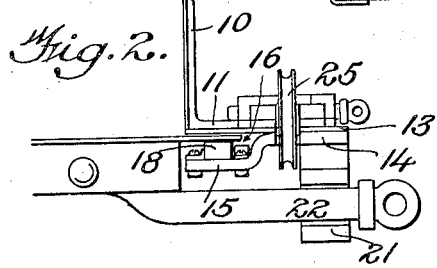
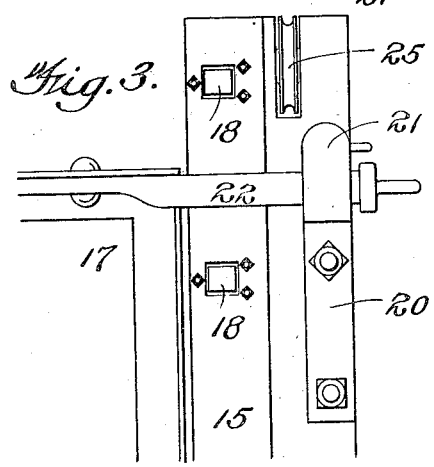
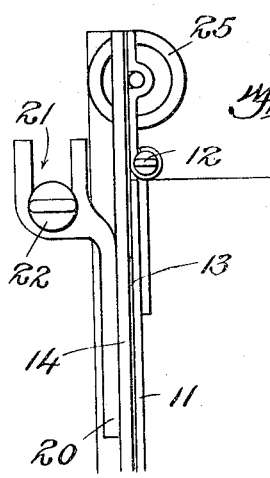
Inventor
C. L. Kissinger,
By W. C. Gee
Attorney

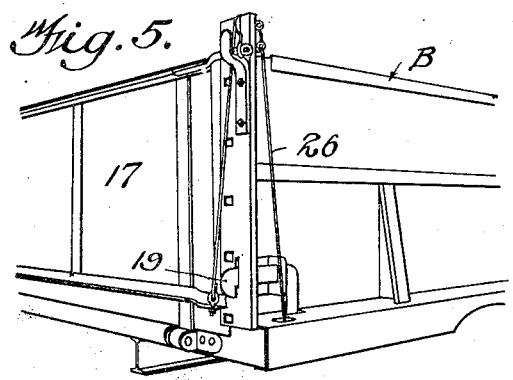
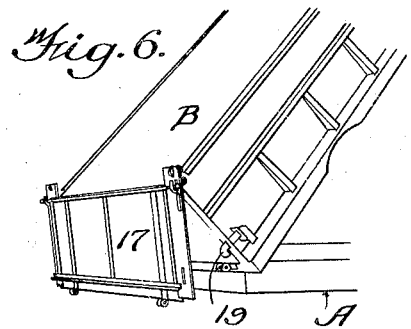
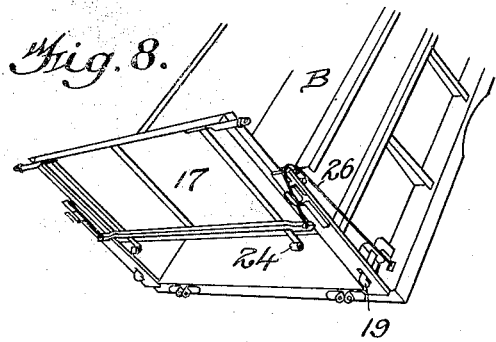
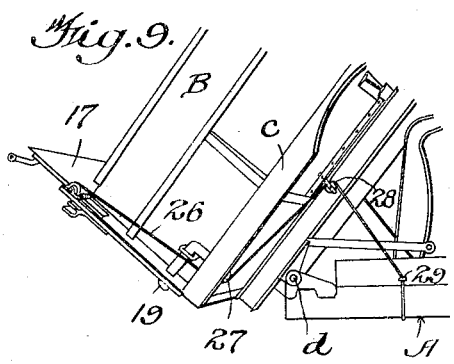
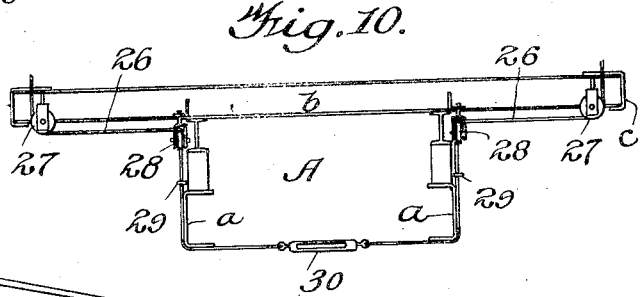
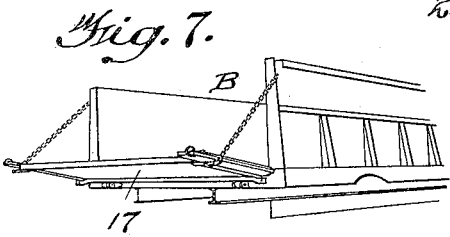

Patented Feb. 2, 1932

1,843,685

UNITED STATES PATENT OFFICE

CHARLES L. KISSINGER, OF ALTOONA, PENNSYLVANIA

AUTOMOTIVE TRUCK

Application filed January 17, 1930. Serial No. 421,552.

This invention relates to automotive trucks, and has particular reference to an improved end gate structure and to an improved operating means therefor.

An object of the invention is to provide an end gate for trucks which may be swung downwardly to an open position about hinge means located at the bottom of the gate, or upwardly to open position about hinge means located at the top of the gate, or which may be opened simply by sliding same upward with respect to the truck body.

While the present end gate is susceptible of use in connection with truck bodies of various different types, it is especially adapted for use with truck bodies of the type which are adapted to be elevated at their forward end to effect discharge of their contents through the rear thereof, and in this connection it is another object of the invention to provide novel means whereby elevation of the truck body automatically opens the end gate.

With the foregoing and other objects in view, the invention consists in the novel features of construction, combination and arrangement of parts as will be hereinafter fully described, illustrated in the accompanying drawings and defined in the appended claims.

In the drawings, wherein like characters of reference denote corresponding parts in the different views:—

Figure 1 is an end elevation of a truck body showing the present end gate and its operating means applied thereto.

Figure 2 is a top plan view on an enlarged scale of one corner of the truck body.

Figure 3 is an end elevation of the parts shown in Fig. 2.

Figure 4 is a side elevation of the parts shown in Fig. 3 of the drawings.

Figure 5 is a perspective view of a corner portion of the truck body showing the end gate closed.

Figure 6 is a similar view showing the front end of the truck body elevated and the end gate swung open about hinges located at the top thereof.

Figure 7 is a view similar to Figs. 5 and 6 showing the end gate swung open about hinges located at the bottom thereof.

Figure 8 is a view similar to Figs. 5 to 7 showing the front end of the truck body elevated and the end gate opened by upward sliding movement relative to the truck body.

Figure 9 is a view similar to Fig. 8 looking from another direction to more clearly disclose the automatic operating means for the end gate; and Figure 10 is a transverse section through the truck frame showing in further detail the end gate operating means.

Referring to the drawings in detail, A designates, generally, a truck frame and B a truck body mounted thereon, the frame A being inclusive of longitudinal main sills $a, a$, on which are arranged transverse members $b$ carrying at their outer ends longitudinal supplemental sills $c, c$, as is usual.

The present end gate structure is adapted for use with a truck body B mounted either rigidly on its supporting frame A or hinged at its rear end to its supporting frame as indicated at $d$ in Fig. 9 of the drawings, whereby its forward end is adapted to be elevated to effect discharge of the contents of the body through the rear end thereof.

In accordance with the present improvements a vertical angle iron member 10 (Fig. 2) is secured rigidly to each side of the body B at the rear end thereof so that one flange 11 of each of said members extends laterally outward from said body flush or substantially flush with the rear end of its related side wall, and to each flange 11, near its upper end, is hinged, as at 12, (Fig. 4) a plate 13 which lies normally against the outer face of said flange.

Secured rigidly to each plate 13 is a second plate 14 having an inwardly directed rearwardly offset portion 15 which cooperates with its related plate 14 to provide a vertical guide channel 16. The end gate, designated generally as 17, has its marginal end portions disposed in these guide channels for vertical sliding movement as shown, and to facilitate such movement the offset portions 15 of the plates 14 preferably are provided with anti-friction rollers 18 for cooperation with the outer face of the end gate at the ends thereof.

To hold the lower ends of the plates 13—14 against outward swinging movement, thereby to prevent outward swinging movement of the gate on the hinges 12, the body 10 carries suitable latch members 19 for cooperation with said plates, said latch members in the present instance extending through slots in the flanges 11 and the plates 13—14 and including hook portions at their free ends for holding engagement with the outer faces of the plates 14, the arrangement as shown being such that the latch members are gravity actuated to latching position and are adapted to be released simply by raising their free ends.

Carried by each plate 14 near its upper end is a bracket 20 having a bifurcated upwardly opening formation 21 to receive a lateral projection or arm 22 carried by the end gate whereby the latter is held against dropping downwardly through its guide channels 16.

Carried at the bottom of the body B are hinge brackets 23 with which hinge brackets 24 carried by the end gate at the bottom thereof are adapted for cooperation. By alining these brackets and engaging hinge pintles therethrough a bottom hinge connection may be provided for the end gate so that it may be opened by downward swinging movement, as illustrated in Fig. 7, provided, of course, the pintles of the hinges 12 are removed, it being understood, of course, that when it is desired that the end gate shall be opened by upward swinging or by sliding movement, only the hinges 12 are employed, the hinge pintles under such conditions being removed from the hinge brackets 23—24.

As will be apparent from the foregoing, the end gate is capable of being opened either by upward sliding movement or by swinging movement either downwardly or upwardly, irrespective of whether the body B is mounted stationarily on its frame A or for tilting movement relative thereto. However, in instances where the truck body B is hinged to the truck frame so that the forward end of the body may be elevated, it is desirable to provide means to effect automatic opening of the end gate when the forward end of the truck body is elevated. To this end the top of each angle iron member 10 is provided with a sheave 25 and over each sheave is extended a cable or other flexible element 26 fastened at one end to a bottom portion of the end gate. The other end portion of each cable is carried downwardly and over a sheave 27 suitably mounted on the truck body and then is carried forwardly and over another sheave 28 also carried by the truck body, being carried finally from the sheave 28 through suitable guide means 29 on the truck frame A and thence beneath the latter and connected with the other cable by a turnbuckle 30. Thus, as the forward end of the truck body is elevated, a pull is caused to be exerted through the cables 26 to slide the end gate upward and thus automatically open the rear end of the truck body for the discharge of its contents.

When the forward end of the truck body is lowered the end gate obviously is permitted to return by gravity to a closed position.

By shifting the guide means 29 forwardly or rearwardly greater or less opening movement of the end gate for a given amount of angular movement of the truck body may be provided for, while by means of the turnbuckle 30 any slack in the cable connections may readily be taken up.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In combination, a truck frame a truck body mounted on said frame for tilting movement with respect thereto, an end gate for said truck body mounted thereon for vertical sliding movement to an open position, a flexible cable connected at its opposite ends with opposite end portions of said end gate and intermediately with the truck frame, and sheaves over which said cable extends whereby tilting movement of the truck body is effective to tension said cable to effect sliding movement of the end gate to an open position, said cable being slidably connected with the truck frame whereby the same is automatically adjusted when tensioned to exert equal amounts of force on the respective end portions of the end gate.

2. In combination, a truck frame, a truck body mounted on said frame for tilting movement with respect thereto, an end gate for said truck body mounted thereon for vertical sliding movement to an open position, a flexible cable connected at its opposite ends with opposite end portions of said end gate and intermediately with the truck frame, and sheaves over which said cable extends whereby tilting movement of the truck body is effective to tension said cable to effect sliding movement of the end gate to an open position, said cable being slidably connected with the truck frame whereby the same is automatically adjusted when tensioned to exert equal amounts of force on the respective end portions of the end gate and slack take-up means included within the length of said cable.

3. In combination, a tiltable truck body open at its rear end, a pair of vertical channel members disposed respectively at opposite sides of the rear open end of said body, an end gate slidably mounted in said channel members, cooperating hinge elements carried by top portions of the truck body and said channel members respectively for the reception of hinge pintles to adapt the end gate for upward and outward swinging movement to an open position relative to the truck body, cooperating hinge elements carried by bottom portions of the truck body and the end gate respectively for the reception of hinge pintless to adapt the end gate for downward and outward swinging movement to an open position relative to the truck body, and means whereby tilting movement of the truck body effects upward sliding movement of the end gate to an open position.

4. In combination, a truck frame, a truck body open at its rear end and mounted on said frame for tilting movement with respect thereto, plates extending laterally outward from the sides of the truck body adjacent to the open rear end thereof, a pair of vertically disposed channel structures one associated with each plate, an end gate slidably mounted in said channel structures, cooperating hinge elements carried by top portions of said plates and said channel structures, respectively, for the reception of pintles to hingedly connect the channel structures and the end gate carried thereby with the truck body for upward and outward swinging movement, cooperating hinge elements carried by bottom portions of the end gate and the truck body, respectively, for the reception of hinge pintles to hingedly connect the end gate to the truck body for downward and outward swinging movement, sheaves carried by top portions of the truck body, and a cable extending over said sheaves and connected at its ends with said end gate and slidably connected intermediate its ends with the truck frame, whereby tilting movement of the truck body is effective to tension said cable to cause the same to effect upward sliding movement of the end gate to an open position.

In testimony whereof I affix my signature.

CHARLES L. KISSINGER.